(12) United States Patent
Jahn et al.

(10) Patent No.: US 8,573,283 B2
(45) Date of Patent: Nov. 5, 2013

(54) METHOD FOR PRODUCING TWO BONDED-TOGETHER LAYERS AND FUNCTIONAL COMPONENT THAT CAN BE PRODUCED BY THE METHOD

(75) Inventors: Peter Jahn, Braunschweig (DE); Rainer Kupetz, Koenigslutter (DE); Ulrich Engel, Hagnau (DE)

(73) Assignee: Zollern BHW Gleitlager GmbH & Co., KG, Braunschweig (DE)

( * ) Notice: Subject to any disclaimer, the term of this patent is extended or adjusted under 35 U.S.C. 154(b) by 899 days.

(21) Appl. No.: 12/447,950

(22) PCT Filed: Oct. 26, 2007

(86) PCT No.: PCT/DE2007/001927
§ 371 (c)(1),
(2), (4) Date: Jan. 19, 2010

(87) PCT Pub. No.: WO2008/052516
PCT Pub. Date: May 8, 2008

(65) Prior Publication Data
US 2010/0136364 A1 Jun. 3, 2010

(30) Foreign Application Priority Data

Nov. 1, 2006 (DE) .......................... 10 2006 051 936

(51) Int. Cl.
*B22D 23/00* (2006.01)
(52) U.S. Cl.
USPC ........................................................... 164/46
(58) Field of Classification Search
USPC ........................ 164/19, 46; 427/405
See application file for complete search history.

(56) References Cited

U.S. PATENT DOCUMENTS

| | | | | |
|---|---|---|---|---|
| 4,926,923 A | * | 5/1990 | Brooks et al. | 164/5 |
| 5,376,462 A | * | 12/1994 | Anderson | 428/546 |
| 5,683,653 A | * | 11/1997 | Benz et al. | 266/202 |
| 6,296,043 B1 | * | 10/2001 | Bowen et al. | 164/46 |

FOREIGN PATENT DOCUMENTS

| | | |
|---|---|---|
| DE | 4235303 | 4/1994 |
| DE | 19924515 | 11/2000 |
| DE | 102004044519 | 3/2006 |
| EP | 0270265 | 11/1987 |
| EP | 3780181 | 11/1987 |
| EP | 0681114 | 11/1995 |
| EP | 1422309 | 5/2004 |
| GB | 1083003 | 10/1964 |
| GB | 1531222 | 9/1974 |
| JP | 62-001849 | 1/1987 |
| JP | 63-145762 | 6/1988 |
| JP | 04-041063 | 2/1992 |
| JP | 05-044753 | 2/1993 |
| JP | 07-195168 | 8/1995 |
| JP | 2003-311304 | 11/2003 |
| WO | WO95/12473 | 5/1995 |
| WO | WO0179575 | 10/2001 |
| WO | WO2005123305 | 12/2005 |

\* cited by examiner

*Primary Examiner* — Kevin P Kerns
(74) *Attorney, Agent, or Firm* — Whitham Curtis Christofferson & Cook, PC

(57) ABSTRACT

To produce at least two bonded-together layers (11, 13; 11', 13), it is proposed that the material of at least one of the layers (13) is melted and subsequently, by spray compacting with a spray cone (10, 10'), is applied to the other layer, which is moved in relation to the spray cone (10, 10'), in such a way that the material composite is thereby produced.

12 Claims, 3 Drawing Sheets

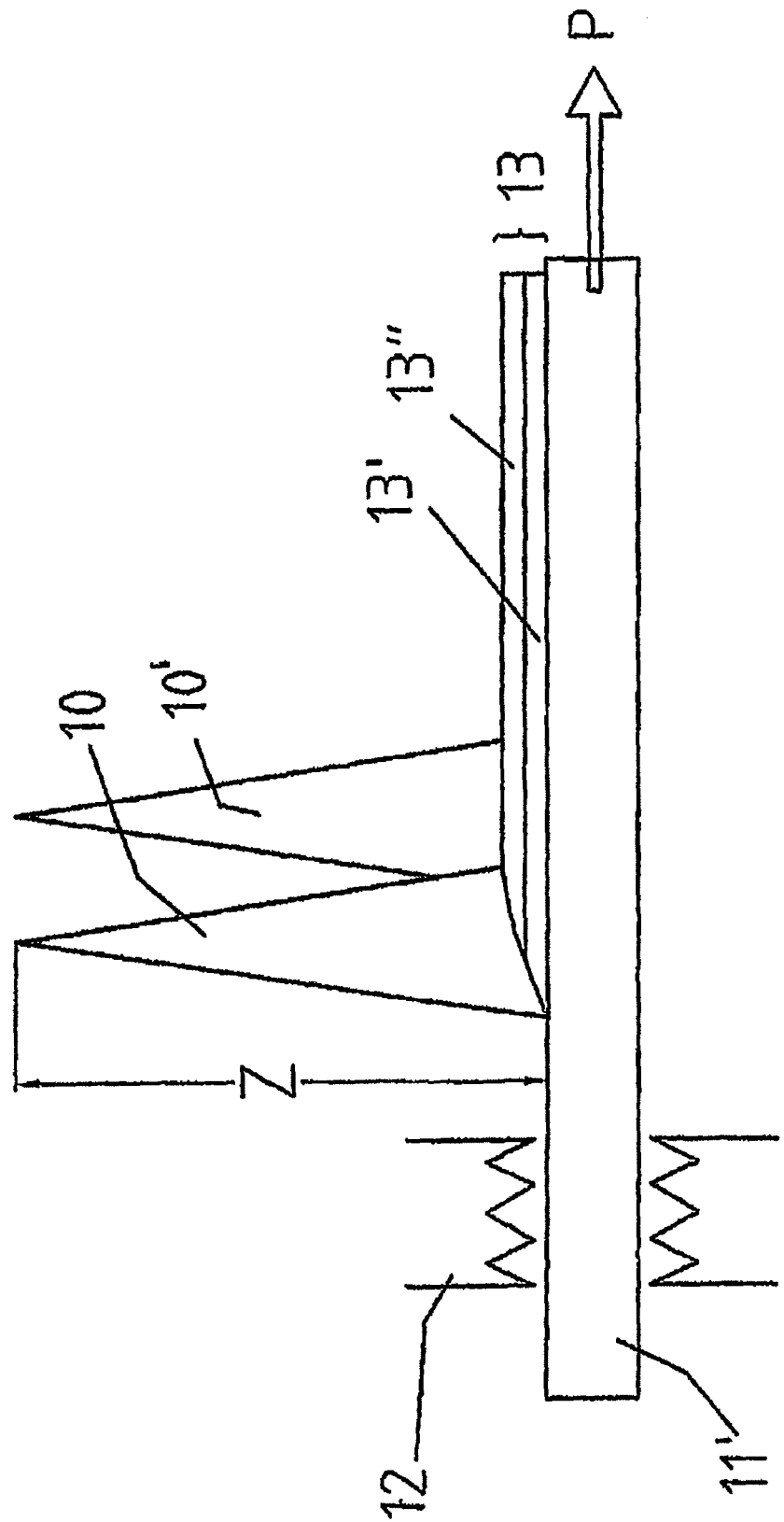

METHOD FOR PRODUCING TWO BONDED-TOGETHER LAYERS AND FUNCTIONAL COMPONENT THAT CAN BE PRODUCED BY THE METHOD

FIELD OF THE INVENTION

The invention relates to a method for producing at least two layers bonded together.

In addition, the invention relates to a functional component that is produced by the method.

BACKGROUND

Numerous methods for producing a functional component where a material composite is produced from a substrate material and a functional layer are known. Such functional components are, for example, bearing components that consist of a stable substrate material, preferably of a ferrous metal, in particular steel, with a functional layer that is made of a non-ferrous metal acting as the bearing layer.

Known from DE 10 2004 044 519 A1 is a method of forming the sliding object of the non-ferrous metal by spray compacting. Spray compacting is a primary shaping method in which the material is melted and via a nozzle arrangement is divided into fine droplets using pressurized gas such that it is formed into a spray cone made up of the droplets. Spraying is carried out in a manner by which the droplets of the spray cone are distributed into a uniform layer on the surface of the form by strong cooling and create a solid layer. The sliding object produced by spray compacting is bonded to a substrate material of the functional component either superficially or punctually by capacitor discharge welding. The production of such a functional component is elaborate, in particular if the functional component is to assume high pressure or load gradients. In such cases, the bond between the sliding object and the substrate must be produced carefully and elaborately by welding. It is the objective of the present invention to simplify the producibility of such a functional component of the aforementioned kind.

SUMMARY

To solve this objective, a production method for such a functional component subject to the invention provides that the material of at least one of the layers is melted and then applied by spray compacting with a spray cone to the other layer that is moved relative to the spray cone such that a material composite is produced thereby.

Thus, according to the invention, two metallic layers can be combined superficially and in a material composite in a positive manner such that the one layer is applied to the other layer by spray compacting. The other layer can, itself, be produced by spray compacting as well. It may not even be necessary for it to be hardened.

The present invention is particularly preferred for a functional component that is made of a metallic substrate material, in particular of a ferrous metal, preferably steel, and of a metallic functional layer made of a non-ferrous metal that is bonded to the substrate. The terms "ferrous metal" and "non-ferrous metal" as well as "metallic material" always include alloys as well.

The invention is based on the awareness that when producing the layer by spray compacting a material composite between the sprayed layer and the other layer can be achieved by a suitable selection of the processing parameters essential for spray compacting, even if, for example, the other layer consists of a ferrous metal and the sprayed layer of a non-ferrous metal. The processing parameters that are relevant for the production of a material composite between the layers are in particular the temperature of the melt that is shaped into a spray cone, the temperatures of the pressurized gas and the environment that cause the temperature drop of the spray droplets until they strike the other layer, the pressure of the spray gas and the temperature of the substrate material. According to the invention, it is possible to select these parameters such that a positive material composite between the layers is created. Thus, the spray compacting method subject to the invention is not utilized as a primary shaping method but as a coating method.

Although the suitable selection of the processing parameters consistently allows for the production of an effective material composite, it may be prudent to apply an interim layer prior to spray compacting, where said interim layer creates a bond to both the substrate material and the material of the functional layer upon impact of the spray droplets of the spray cone. The bond is made possible by the transferred heat increase when the spray droplets of the spray cone impact the interim layer. As is essentially known for primary shaping using spray compacting, non-metallic solid particles can be added to the melt in order to control the performance characteristics of the sprayed-on functional layer through the consistently uniform distribution of the solid particles in the functional layer.

In one particularly advantageous embodiment of the invention, the functional layer is produced in one pass of at least two materials that are provided as a melt and are sprayed onto the substrate. The melts can be sprayed on in the direction of movement of a carrier that may be the substrate. The melts can be sprayed onto the carrier in succession in the direction of the movement of the carrier. Depending on the purpose of the application, it may be useful to spray the layer that is subsequently sprayed on in the direction of the movement of the carrier onto the previously sprayed-on and already hardened layer, such that a functional layer is formed of two layers that are arranged on top of each other on the substrate and are combined with each other in a material composite. In this arrangement it is also possible that the functional layer that is formed of the two layers that are arranged on top of each other is also bonded to the carrier as the substrate or that the carrier receives no bond to the two layers and is removed after the production of the two interconnected layers as is typical for the primary shaping of a component made of a uniform material using a spray compacting method.

However, it is also possible to set the temperature of the substrate and/or of the melts such that the materials in the form of fine blended droplets form a functional layer. In this manner it is possible to produce a functional layer with an alloy of materials that cannot be alloyed with each other when using conventional methods.

In a modified embodiment of the method subject to the invention, the temperatures of the substrate or the carrier, respectively, and or of the melts of the different materials can be set such that the layers blend only partially prior to solidifying and in this manner form a gradient functional layer. If the two materials are sprayed on in succession in the direction of the movement, such a partial blend is produced across the thickness of the functional layer, thus forming a gradual transition from the primarily first material to the primarily second material, in other words, the layers transitioning from one to the other.

The invention can be utilized particularly advantageously for friction bearing layers. Essentially conflicting demands are made on friction bearing layers. For one, such layers are to have a good embedding capacity for foreign particles that may be transported into the bearing by lubricants, for example, in order for the bearing not to be destroyed by the foreign particles, and for another, the friction bearing is to exhibit a long service life and in particular good emergency operation properties for cases when the friction bearing layer exhibiting the high capacity for embedding is worn.

By designing a friction bearing layer consisting of two or more different layers the different requirements, in particular the high embedding capacity of one layer and good emergency operation properties of the layer located underneath can be accommodated. The friction bearing layers are in this case layers made of non-ferrous metals.

The layers produced according to the invention and arranged on top of each other can exhibit the same matrix structure yet different compositions or can be made of different matrix structures—and thus different compositions.

Examples for such layer combinations with the same matrix are CuSn6/CuSn15. According to the invention such a layer combination can be applied on a ferrous substrate.

Layer combinations consisting of alloys with different matrixes are for example CuSn/SnSbCu, AlSn/SnSbCu.

Solid particles inserted into the layer during spray compacting may be, for example, solid particles made of diamond, carbides, silicates and ceramic-type particles, while the soft particles may be particles with lubricating characteristics such as $MoS_2$, PTFE, silicones, barium sulfate, etc. Melting of the solid particles in the melt is typically prevented by mixing in the solid particles via the spray gas, i.e., typically not by adding them to the melt. This results in a short contact time between the spray droplets and the solid particles during which the transferred heat is not sufficient to bring the solid particles to a melting point. As an alternative, solid particles can be used that have a melting temperature that is higher than the temperature of the melt of the material for the functional layer.

The method subject to the invention does not exclude that the substrate is produced by spray compacting in an essentially known primary shaping process as well.

The method subject to the invention is suited for the production of material composites with plane substrates as well as with three-dimensional substrates such as, for example, tubes, spheres, etc. The relative movement between the substrate and the spray cone can be linear, however, is preferably in the shape of a scanning process with a preferably sinusoidal course of movement.

DESCRIPTION OF THE DRAWINGS

Below, the invention shall be described in greater detail using exemplary embodiments presented in a drawing, of which:

FIG. 3 shows a schematic presentation of the application of a functional layer consisting of two partial layers using two spray cones.

DETAILED DESCRIPTION

Figure 1:
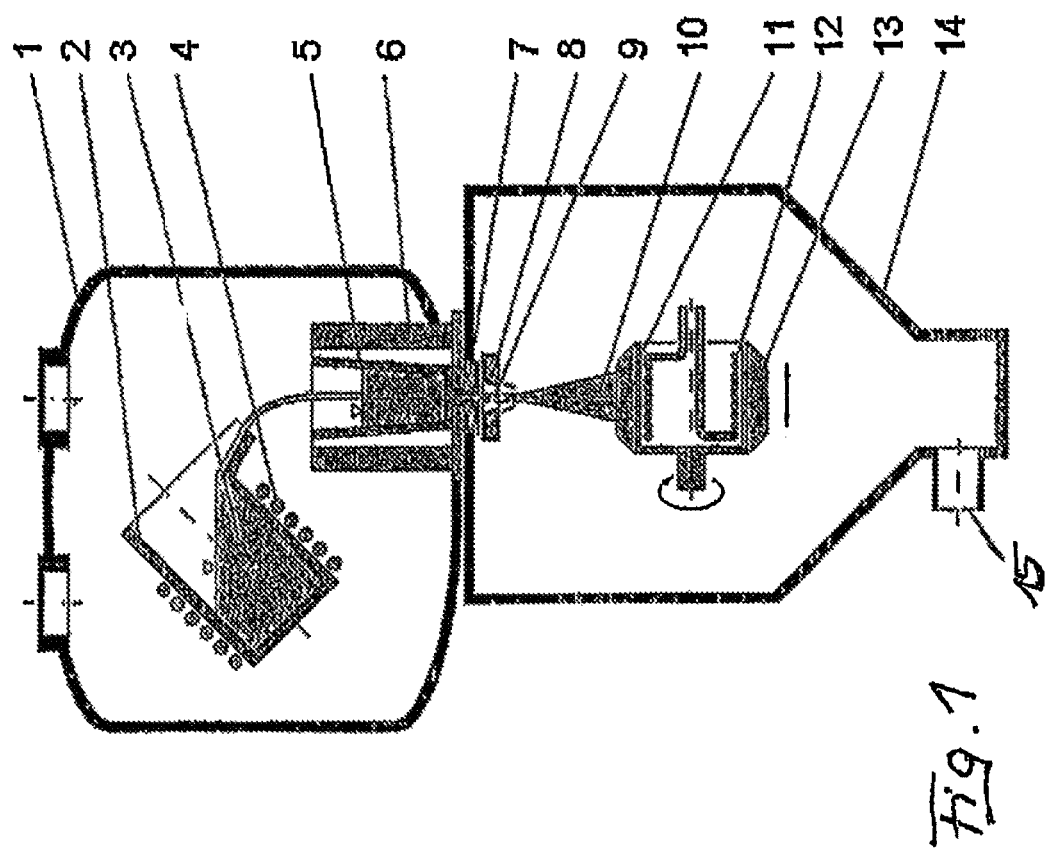
FIG. 1 shows a schematic section of device suitable for carrying out the method subject to the invention for producing a material composite by spray compacting.

FIG. 1 shows a tank 1 containing a crucible 2 that is filled with the melt of a material 3. The material is melted using a heating coil 4 is kept at a desired melt temperature of, for example, 1,150° C. if the material is a $CuSn_6$ alloy. The melted material prepared in this manner enters a distribution vessel 5 that is kept inside a distribution oven 6 at the desired melt temperature. By opening the floor of the distribution vessel 5, a melt stream exits and passes through a primary gas nozzle 7 and an atomizer gas nozzle 8 in the form of a melt stream 9. The atomized gas is reshaped into a spray cone 10 in the atomizer gas nozzle 8 using a positive pressure of, for example, 3.5 bar. The droplets of the material 3 contained in the spray cone 10 arrive on a substrate 11, which in FIG. 1 is shaped in the form of a tube. The substrate 11 is preheated using a substrate heater 12 in the form of a conductor coil until a temperature of approximately 1,000° C. (for a St-37 steel substrate) is reached. In the exemplary embodiment shown in FIG. 1, the substrate 11 is rotated around an axis that is located in the tube axis of the substrate 11 such that a functional layer 13 is built on the substrate 11.

The entire spray system is located in a chamber 14 that exhibits an outlet 15 for discharging the atomizing gas.

An inert gas such as nitrogen in particular is preferably suitable as an atomizer gas. A corresponding inert atmosphere is also useful within the tank 1 or may even be required for many materials.

In one exemplary embodiment, the rotational frequency for the rotation of the tube-shaped substrate 11 is 1.2 Hz, the distance Z between the evaporator gas nozzle 8 and the substrate 11 is 330 mm and the coating time is about 130 s. During this time a mass of about 32 kg has been applied as a functional layer 13 onto the substrate 11. For a diameter of the substrate of 380 mm and a length of 140 mm.

Figure 2:
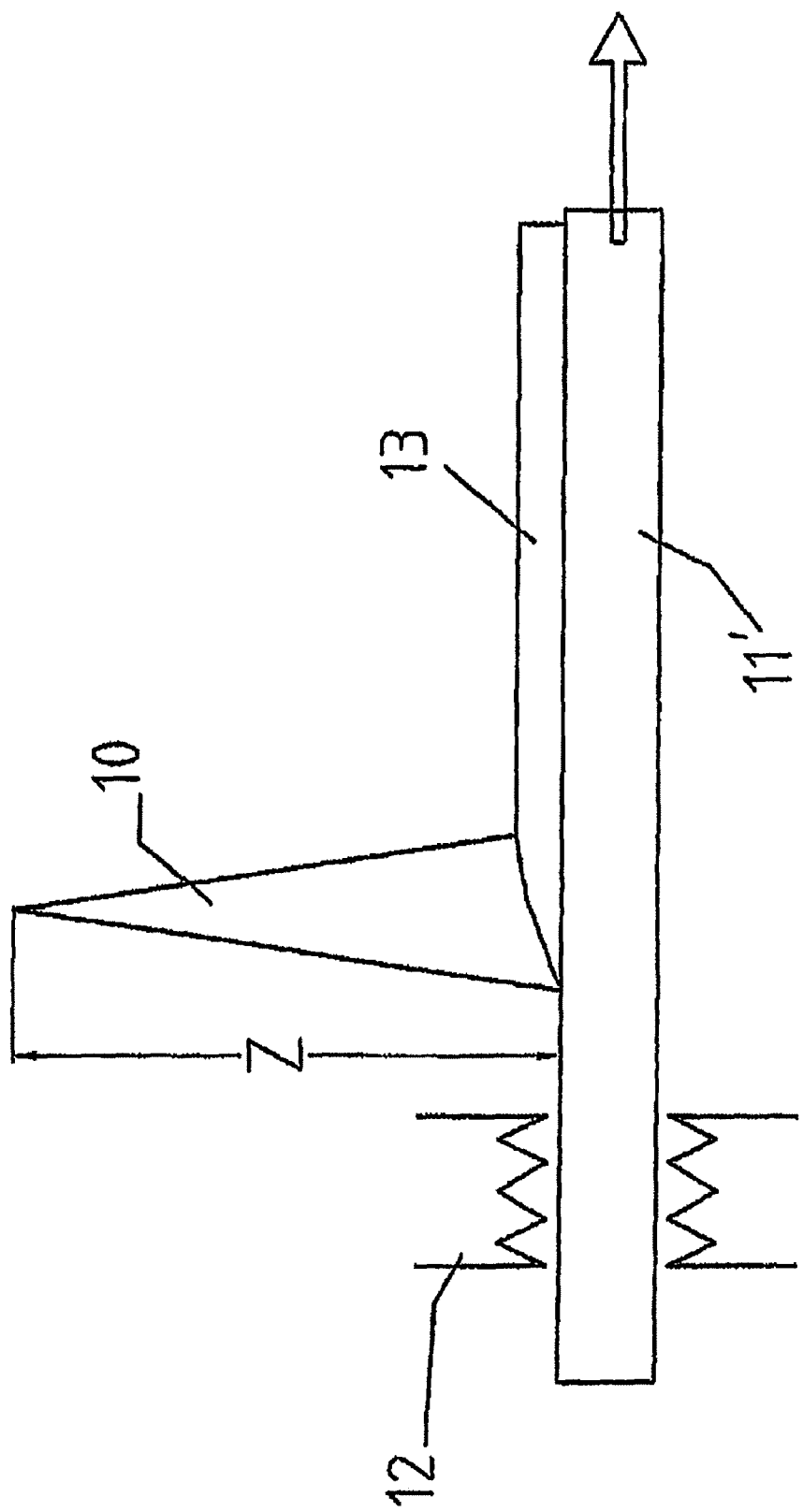
FIG. 2 shows a schematic presentation of the application of a functional layer of a material composite with a substrate.

The atomizing pressure was between 2.5 and 3.5 bar and it was demonstrated that an increased atomizing pressure of 3.5 bar can be reduced to a pressure of less than 3 bar during the spraying process. Advantageously, after the coating procedure, the substrate 11 with the functional layer 13 can be cooled in air. If required in individual cases, mechanical secondary compacting may be carried out. FIG. 2 clarifies schematically a plane substrate 11' to which the functional layer 13 is applied using the spray cone 10. Here too a substrate heater 12 is provided in order to set the optimal conditions for the production of the material composite.

However, it shall be pointed out that heating of the substrate for producing a material composite is not required in every case. The potential heating depends on the material used for the substrate 11, 11'. With the embodiment shown in FIG. 3, the functional layer 13 consists of two partial layers 13', 13" that are applied using two spray cones 10, 10' arranged in succession in the direction of the substrate movement P. The spray cones 10, 10' overlap somewhat at the level of the substrate 11', such that a transitional zone (not shown) occurs between the two partial layers 13' and 13", which is conducive for the bond of the two partial zones 13', 13" to each other.

The material composite achieved according to the invention between the substrate 11, 11' and the functional layer 13 can be achieved for the various material combinations through the selections of suitable processing parameters as has been explained for the exemplary embodiment presented above.

Considered in particular as processing parameters are the temperature of the melt 3 or of the melt stream 9, respectively, the pressure of the atomizing gas for generating the spray cone 10, the temperature of the substrate 11, 11' as well as the speed of the relative movement of the substrate 11, 11' relative to the spray cone 10, 10', whereby it is possible that the relative movement is formed by a combined movement of one component in the conveyer direction P and a second component perpendicular to it (for example, a rotational movement for the tube-shaped substrate 11 according to FIG. 1).

For some applications it may be prudent to pre-treat the substrate 11, 11' by applying a thin interim layer with the interim layer potentially functioning as bond-enhancing interim layer. Such an interim layer can improve the material composite between problematic material pairs of a substrate 11, 11' and a functional layer 13 by, for example, creating an inter-metallic bond between the substrate 11, 11' and the interim layer on the one hand, and the interim layer and the functional layer 13 on the other hand, while a direct bond between the substrate 11, 11' and the functional layer 13 would be problematic.

An interim layer can also be useful when the material composite between the functional layer 13 and the substrate 11, 11' may be at risk under certain conditions, for example due to very different coefficients of thermal expansion. An interim layer with a coefficient of thermal expansion that is between that of the substrate 11, 11' and the functional layer 13 can increase the resultant material composite's resistance to greater temperature fluctuations.

In a similar fashion, the interim layer can also be advantageous for an improved take-up of shear forces, for example for a required secondary compacting of the spray layer if the material of the interim layer is capable of taking up such shear forces and therefore allows only a reduced transfer of these forces to the substrate 11, 11'. This function of the interim layer can also be utilized advantageously for subsequent processing steps such as pressing, rolling or forging.

Conventional weld, solder or diffusion layers are possibilities for bond-enhancing interim layers. In addition, fusions can be used that lead to intermediary bonds and/or to the formation of mixed crystals.

The interim layers can be applied to ferrous or non-ferrous substrates using conventional methods such as, for example, electroplating, dipping, roll cladding, friction welding and sputtering.

Suitable interim layers may be made, for example solely or primarily, of copper, tin, zinc, nickel, bismuth, silver, nickel-tin, chrome, aluminum, aluminum-tin, aluminum-zinc, nickel-chrome, etc. Zinc or tin interim layers, for example, are bond-enhancing for iron, copper or iron-aluminum material composites.

The drawing shows that the two spray cones 10, 10'3, 4 exhibit the same height Z above the substrate surface 11', which is defined by the arrangement of the respective (not shown) spray nozzles. It is, of course, also possible to vary the design of the layers 13', 13" by selecting a greater height Z for one spray cone than for the other. Correspondingly, it is also possible to vary the thickness of the applied layers 13', 13" by designing the material throughput through the nozzles of the spray cones 10, 10' differently, possibly in connection with different heights Z of the spray cones 10, 10'. The formation of the functional layer 13 or of the partial layers 13', 13" can also be affected by varying the pressure of the spray gas.

The method subject to the invention enables the direct production of functional components in a simple manner by applying the functional layer 13 of the material composite through spray compacting. Thus, all processing steps required thus far for bonding substrates 11, 11' and the functional layer 13 can be omitted.

One preferred embodiment of the invention is the production of friction or roller bearing components using the described layer structures.

EXAMPLES

1. A spray layer of bronze (CuSn, CuMeX) is sprayed onto a steel substrate 11, 11', such that a material composite is created. In this case, the spray layer constitutes the functional layer 13.
2. A spray layer of SnAl30 is sprayed onto a steel substrate 11, 11' and acts as the functional layer 13. Prior to that, the substrate 11, 11' has been provided with an interim layer with a thickness of less than 10 µm acting as a bond-enhancing or diffusion-preventing layer. Possible materials for the interim layer are Cu, Sn/Zn, Sn, etc.
3. Two layers 13, 13' consisting of different alloys are sprayed onto a steel substrate 11, 11' that consist of differing alloys. In the process, a direct bond with the steel substrate is created. The two layers (13, 13") can be applied in such a manner that no significant blending areas are formed. Thus, one layer of material is present.

The two layers 13, 13" can also be deposited with a significant blending zone to form a gradient material. The realized layer thicknesses of the layers 13', 13" are freely selectable.
4. A first functional layer 13' (for example $CuSn_x$) is sprayed onto a steel substrate 11, 11' producing a material composite. An interim layer with a layer thickness of <10 µM is then applied to the first layer 13'. The interim layer materials may be, for example Ag, Sn, Ni, etc. Thereafter, a second layer 13" is applied as a spray layer, for example one made of AlSn.

Without the interim layer, the two layers 13', 13" would form inter-metallic bonds with undesirable characteristics, in particular a high brittleness. Thus, the interim layer prevents diffusion between the layers 13', 13" and the formation of the undesired inter-metallic phase between the layers 13', 13". The interim layer may be sprayed on as well, however, a conventional application is preferred.
5. A first spray layer 13 acting as the functional layer is applied on a carrier without producing a material composite with the carrier. The spray layer may be designed in the form of a half cylinder. When the functional layer 13 is produced, the substrate 11, 11' of steel can then also be produced by spraying and applied to the inner wall of the cylindrical functional layer 13. If desired, an interim layer can be provided here as well, which will then be applied prior to spraying the substrate 11, 11' onto the inside wall of the functional layer 13.

The invention claimed is:

1. A method for producing a material composite comprising a substrate and at least one functional layer made from at least two different materials which are not alloyable by conventional methods, comprising the steps of:

melting a first material and a second material, said first material being different from said second material, said first material not being alloyable with said second material by mixing said first material and said second material together in a molten state;

spray compacting said first material and said second material onto a surface of a substrate, said spray compacting being performed simultaneously from at least a first nozzle and a second nozzle which respectively spray droplets of said first material and said second material towards said substrate using a spray gas, wherein said spray compacting is performed under conditions which control a temperature of a melt of said first material and a temperature of a melt of said second material, a temperature and a pressure of said spray gas; and producing at least one functional layer on said surface of said substrate from said first material and said second material by allowing droplets of said first material and said second material to intermingle for a short period on said surface of said substrate in a liquid state, and then hardening intermingled droplets of said first material and said second material into said at least one functional layer which is bonded to said surface of substrate and with said first material being alloyed to said second material as one composition.

2. The method of claim 1 wherein said spray compacting step is performed under conditions which control an ambient temperature of a volume in which said spray compacting is performed and control a temperature of said substrate.

3. The method of claim 1 further comprising the step of moving said substrate relative to first and second spray cones emitted from said first and second nozzles during said spray compacting step.

4. The method of claim 3 wherein said step of moving is performed by rotating said substrate while said substrate is in a path of said first and second spray cones.

5. The method of claim 3 wherein said step of moving is performed by laterally conveying said substrate while said substrate is in a path of said first and second spray cones.

6. The method of claim 3 wherein said first and second spray cones overlap.

7. The method of claim 3 wherein said at least one functional layer is A sprayed on said substrate in one pass.

8. The method of claim 1 wherein said first material includes a ferrous metal and said second material includes a non-ferrous metal.

9. The method of claim 1 wherein said surface of said substrate includes a bond enhancing and/or diffusion preventing interim layer.

10. The method of claim 1 wherein said substrate is a ferrous metal, and said at least one functional layer includes a non-ferrous metal.

11. The method of claim 1 wherein said spray compacting step and said producing step are performed in a manner which produces a gradient in said at least one functional layer.

12. The method of claim 1 further comprising the step of adding non-melting solid particles to one or more of said first material and said second material.

* * * * *